Aug. 9, 1960 W. J. KENNEDY 2,948,377

SHIELD FOR COIN GAUGE ON COIN COLLECTORS

Filed Dec. 20, 1957 2 Sheets-Sheet 1

INVENTOR
W. J. KENNEDY
BY
ATTORNEY

Aug. 9, 1960 W. J. KENNEDY 2,948,377

SHIELD FOR COIN GAUGE ON COIN COLLECTORS

Filed Dec. 20, 1957 2 Sheets-Sheet 2

INVENTOR
W. J. KENNEDY
BY [signature]
ATTORNEY

United States Patent Office 2,948,377

Patented Aug. 9, 1960

2,948,377

SHIELD FOR COIN GAUGE ON COIN COLLECTORS

William J. Kennedy, Homestead Park, N.J., assignor to Bell Telephone Laboratories, Incorporated, New York, N.Y., a corporation of New York Filed Dec. 20, 1957, Ser. No. 704,115

4 Claims. (Cl. 194—1)

This invention relates to a shield for covering the coin gauge of coin telephone pay stations of the drive-in type and comprises a pivotally mounted shield member controlled by the operation of the handset as it is removed or replaced on the switch hook.

An object of this invention is to provide means whereby the coin gauge of pay telephone stations, such as those installed along curbs, safety islands and roadside cut-offs, is protected from the entrance of water, dirt and the like, which if permitted to enter the coin gauge would impair the operation of the telephone device.

Another object of this invention is to provide a shield member so constructed that it can be displaced automatically to uncover the coin gauge of a pay telephone by the removal of the handset from the switch hook, and also capable of returning automatically to its former position when the handset is replaced.

The embodiment of the present invention comprises a shield having integral therewith a plurality of arms pivotally supported to a bracket which is fixedly secured to the top of the upper casing of a pay telephone station for maintaining the shield in juxtaposition with respect to the coin gauge. The action of the shield is controlled by the operation of the handset as it is removed from the cradle of the switch hook and replaced therein.

Other novel features and advantages of the invention will appear from the following description, together with the accompanying drawings, in which.

Figure 1:
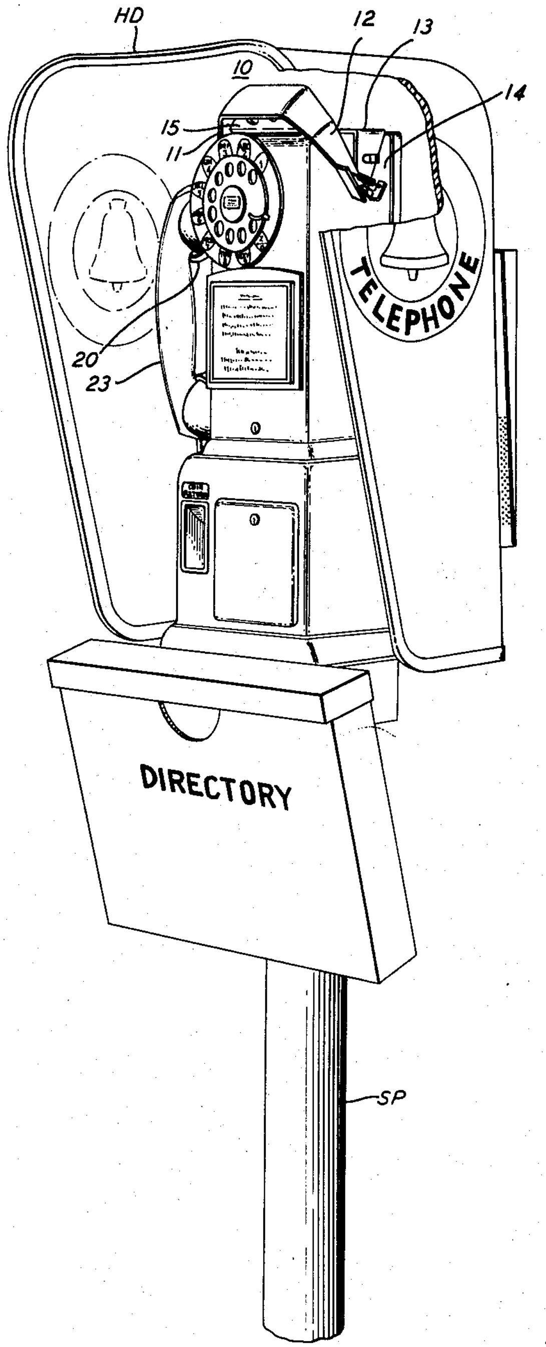
Fig. 1 is a perspective view in elevation illustrating a drive-in pay telephone station showing the shield of this invention normally positioned covering the coin gauge.

The device of this invention as shown in Figs. 1, and in more detail in Figs. 2, 3, 4 and 5 comprises a shield member 10 constructed with arms 11 and 12 which are integrally formed thereon and which are pivotally mounted at their ends to a bracket 13. The bracket 13 is fixedly secured to the top of the coin telephone casing 14 which is mounted on a suitable support SP and is protected by means of the hood HD. The bracket 13 operatively associated with the shield member 10 serves to maintain the said shield in juxtaposition with respect to the coin gauge 15.

Figure 2:
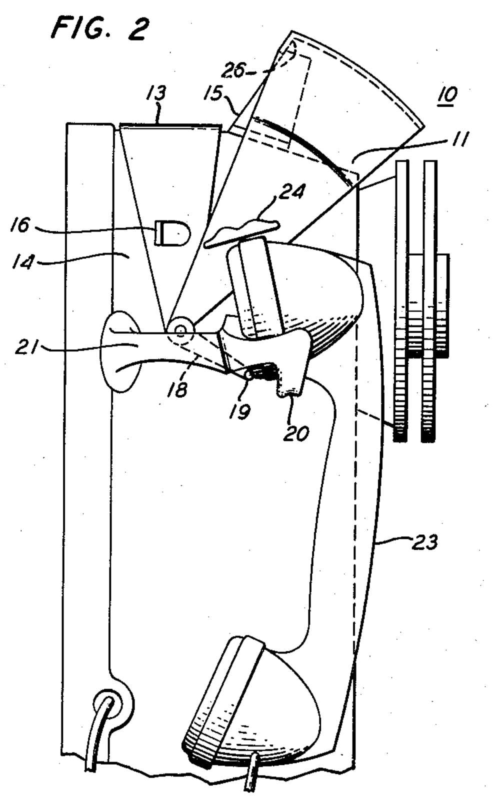
Fig. 2 is a fragmentary side elevational view of a pay telephone station showing the shield member positioned over the coin gauge and the means by which the shield member is so positioned and held thereto.
Figure 3:
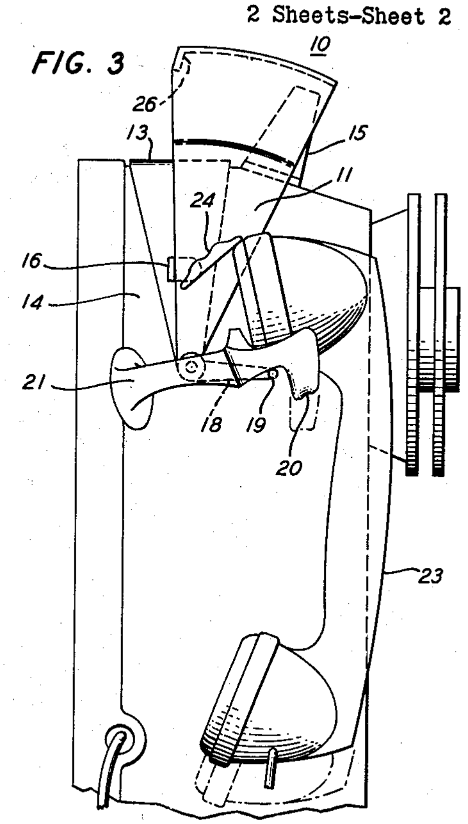
Fig. 3 is a view similar to Fig. 2 but showing the shield member in raised position, with the handset in the process of being removed.
Figure 4:
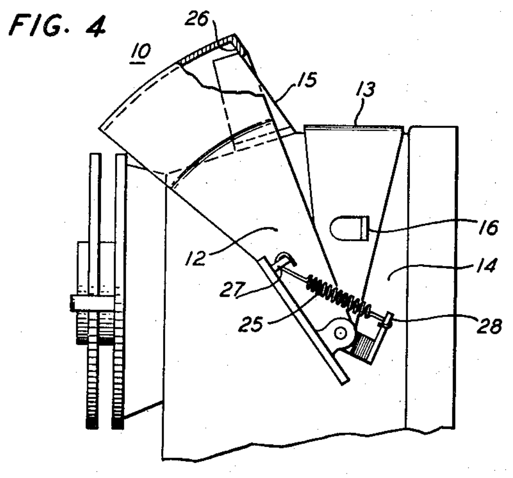
Fig. 4 is a fragmentary right side elevational view showing the shield member in its normal position, and partially broken away to disclose the stop means for limiting its downward movement, and showing also a biasing spring member attached between the shield member and its fixed mounting bracket.

In Fig. 2 and Fig. 3 the arm member 11 as shown is formed integral with the arm crank 18, the extended end of which is provided with the protuberance 19, which is operatively connected with the inner lower edge of the cradle 20, when the switch hook 21 is actuated downward by the replacement of the handset 23 thereon consequently causing the shield member 10 to be moved downward with its stop member 26 positioned against the top edge of the coin gauge 15 as shown in Figs. 2 and 4, thereby positioning the shield member 10 over the coin gauge 15, whereat it is maintained by the weight thereof, as shown in Figs. 1, 2 and 4.

Figure 5:
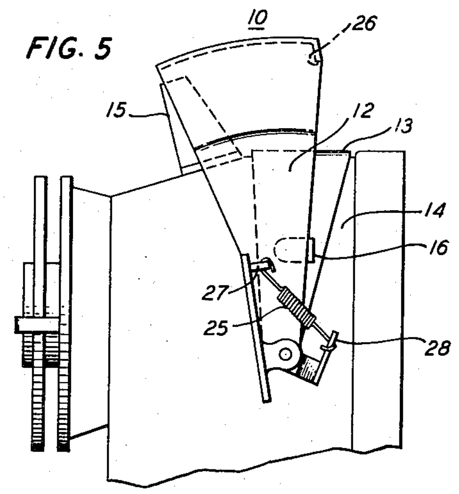
Fig. 5 is a view similar to Fig. 4 but showing the shield member fully raised and held spring biased against a stop member, which is affixed to its mounting bracket.

In addition, the arm member 11 is provided with an elongated extending member 24, which is suitably located thereon for operatively engaging the top of the handset 23 during its removal from the cradle 20 consequently lifting the shield member 10 which in turn is effectively moved upward automatically and held in a raised position against the stop member 16 by the tension of the off-center spring 25 which is attached to the arm member 12 and the bracket 13, by means of the ear members 27 and 28 provided thereon respectively, as shown in Fig. 4 and Fig. 5. Thus, the coin gauge 15 is fully exposed for depositing coins as shown in Figs. 3 and 5.

*Operation of the shield*

To initiate a call on a pay telephone station provided with the device of this invention, the customer must first remove the handset 23 from its cradle 20. In so doing, as the handset 23 is raised it will engage the elongated member 24, provided on the arm member 11, thereby forcing the shield member 10 upward a distance sufficient to shift the line of action of the off-center spring 25 which is suitably attached to the arm 12 and the bracket 13. The force produced by the spring 25 insures the full operation upward of the shield member 10 and holds it in open position, thereby exposing the coin gauge 15, as shown in Fig. 3 and Fig. 5.

When the call is terminated the handset 23 is replaced and the switch hook 21 is forced downward by the weight of said handset. During the downward motion of the switch hook 21, the handset cradle 20 engages the protuberance 19 of the arm crank 18 thereby driving the shield member 10 downward and positioning its stop member 26 against the top of the coin gauge 15. The shield member 10 is thus held by its weight, in a closed position covering the coin gauge 15, as shown in Fig. 2.

It is to be understood that the above-described arrangements are illustrative of the application of the principles of the invention. Numerous other arrangements may be devised by those skilled in the art without departing from the spirit and scope of the invention.

What is claimed is:

1. A coin operated telephone set comprising a casing, a switch hook extending from said casing, and having a telephone handset positioned thereon, a gauge for the reception of coins mounted on said casing, a shield normally positioned over and covering said gauge, said shield pivotally mounted on said casing and provided with means operatively associated with said handset by its removal thereof from said switch hook to expose said gauge, and additional means operatively associated with said switch hook by the replacement thereon of said handset for returning said shield automatically to its normal position.

2. A coin operated telephone set comprising a casing, a switch hook extending from said casing, and having a telephone handset positioned thereon, a gauge for the reception of coins mounted on said casing, a shield positioned over and covering said coin gauge, said shield pivotally mounted to said casing, and having integral therewith an elongated protuberance operatively connected with said handset by the removal thereof from said switch hook to expose said coin gauge, said shield having a crank arm integral therewith and operatively connected to said switch hook by the replacement thereon of said handset for returning said shield automatically to its normal position covering the coin gauge.

3. A coin operated telephone set comprising a casing, a switch hook extending from said casing, and having a handset positioned thereon, a gauge for the reception of coins mounted on said casing, a shield positioned over and covering said gauge, said shield pivotally mounted on said casing, and having integral therewith an elongated protuberance operatively connected with said handset by the removal thereof from said switch hook, and means serving cooperatively with the removal of said handset for automatically positioning and maintaining said shield to expose said coin gauge, said shield having also a crank arm integral therewith and operatively connected to said switch hook by the replacement thereon of said handset to return said shield automatically to its normal position.

4. A coin operated telephone set comprising a casing, a switch hook extending from said casing, and having a handset positioned thereon, a gauge for the reception of coins mounted on said casing, a shield normally positioned over and covering said gauge, a stop for said shield, said shield pivotally mounted on said casing and having integral therewith an elongated protuberance operatively connected with said handset by the removal thereof from said switch hook, a spring member attached biased to said shield and provided as means for serving cooperatively with the removal of said handset to automatically position and maintain said shield against said stop, thereby exposing said coin gauge, said shield having a crank arm integral therewith and operatively connected to said switch hook by the replacement thereon of said handset for automatically returning said shield to its normal position covering said coin gauge.

References Cited in the file of this patent

UNITED STATES PATENTS

| | | |
|---|---|---|
| 2,039,519 | Collins | May 5, 1936 |
| 2,701,044 | Cassidy | Feb. 1, 1955 |